United States Patent [19]
Hurner

[11] Patent Number: 5,425,432
[45] Date of Patent: Jun. 20, 1995

[54] OIL ADDITION DEVICE

[76] Inventor: Erwin E. Hurner, 920 Belsly Blvd. South, Moorhead, Minn. 56560

[21] Appl. No.: 221,859

[22] Filed: Apr. 1, 1994

Related U.S. Application Data

[63] Continuation-in-part of Ser. No. 201,743, Feb. 25, 1994, abandoned.

[51] Int. Cl.⁶ ............................................. F01M 11/12
[52] U.S. Cl. .................................... 184/103.2; 184/74
[58] Field of Search ................... 184/65, 74, 82, 103.1, 184/103.2

[56] References Cited

U.S. PATENT DOCUMENTS

| | | | |
|---|---|---|---|
| 1,230,658 | 6/1917 | Brace | 184/103.2 |
| 1,352,954 | 9/1920 | Hansen | 184/103.2 |
| 1,541,866 | 6/1925 | Sorensen | 184/103.2 |
| 1,659,859 | 2/1928 | Cox | 184/103.2 |
| 1,883,202 | 10/1932 | White | 184/103.2 |
| 2,283,303 | 5/1942 | Whitlock | 184/103.2 |
| 2,886,056 | 5/1959 | Ratliff | 184/103.2 |
| 3,015,371 | 1/1962 | Gits | 184/103.2 |
| 4,603,666 | 8/1986 | Martinelli | 184/103.2 |

FOREIGN PATENT DOCUMENTS 22270 of 1902 United Kingdom ............. 184/103.2

*Primary Examiner*—Thomas E. Denion
*Attorney, Agent, or Firm*—Hardaway Law Firm

[57] ABSTRACT

The apparatus according to the invention causes the level of lubricating fluid in a crankcase of an internal combustion engine to be maintained at a predetermined level at all times without reliance on power to operate the valve used to control the flow of lubricating fluid coming from an auxiliary reservoir to the crankcase.

20 Claims, 3 Drawing Sheets

OIL ADDITION DEVICE

This application is a continuation-in-part of U.S. Ser. No. 08/201,743 filed Feb. 25, 1994.

BACKGROUND OF THE INVENTION

A problem which has been constantly plaguing vehicles having engines relying on lubricating fluids is keeping the amount of lubricating fluid at the proper level. Lubricating fluid levels are known to decrease due to leakage and burning of the fluid inside the engine when the engine is not working properly. Furthermore, operating an engine for even a short amount of time with an inadequate amount of lubricating fluid will result in damage to the lubricated components of the engine.

There have been numerous attempts to solve this problem. These attempts have their own drawbacks because they usually: require an additional source of power to control their valves, only check the level of oil at predetermined times, or only operate when the engine is running. This last drawback is especially a problem when, for example, an engine is started after a vehicle has remained unattended for many months in a garage while leaking oil. While in the perfect world, the level of oil would be checked prior to starting the vehicle, this is not always done.

The apparatus according to the invention allows for the level of lubricating fluid in a crankcase of an internal combustion engine to be maintained at a predetermined level at all times.

SUMMARY OF THE INVENTION

It is an object of the invention to provide an apparatus that assures a predetermined level of lubricating fluid is maintained within a crankcase.

It is a further object of the invention to provide such an apparatus that requires no source of power to operate.

It is a further object of the invention to provide such an apparatus that is immune to the effects of bumps hit by the vehicle or splashing within the crankcase.

It is a further object of the invention to provide such an apparatus whose accuracy is not adversely affected by gas pressure changes occurring in the crankcase above the lubricating fluid.

These and other objects of the invention are achieved by the apparatus herein disclosed and described.

DETAILED DESCRIPTION

Figure 1:
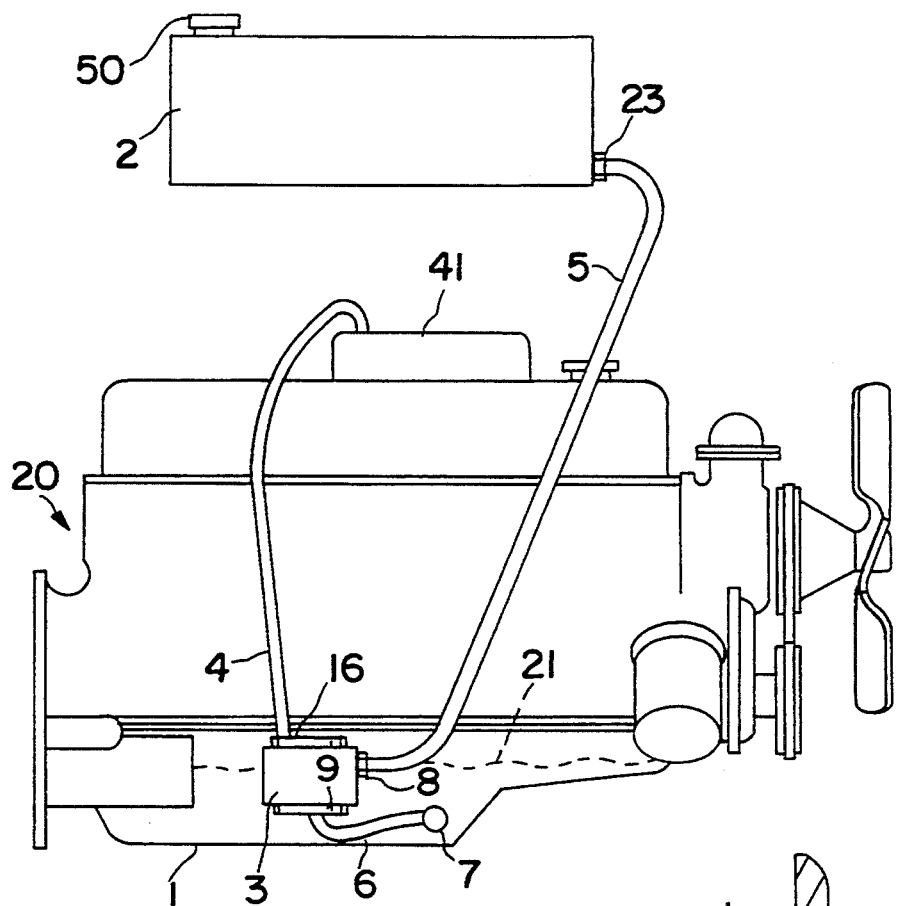
FIG. 1 is a schematic view of the components making up the apparatus according to the invention.

FIG. 1 shows the overall structure of the apparatus according to the invention. Engine 20, preferably an internal combustion engine, has a crankcase 1. This crankcase 1 is filled, up to a predetermined level 21 with lubricating fluid, preferably conventional motor oil. Mounted on the vehicle, and above the engine to which the crankcase 1 is attached is a reservoir 2 of additional lubricating fluid. This reservoir 2 contains the same kind of lubricating fluid contained in the crankcase 1. Reservoir 2 has a vented filler cap 50 which prevents the formation of a vacuum therein. The reservoir 2 is fluidically connected to a fluid port in the form of a drain plug 7 at a conventional location in the crankcase 1 by way of a float valve 3. This float valve 3 is mounted to the crankcase 1 at the predetermined level 21, which is the level at which it is desired to maintain the lubricating fluid in the crankcase 1.

Figure 4:
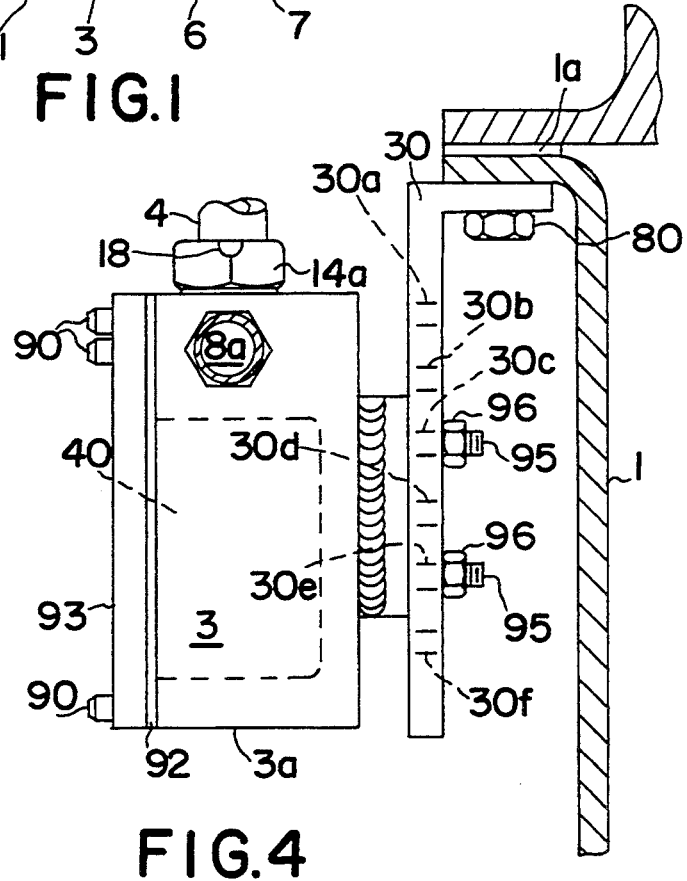
FIG. 4 is a view showing how the valve is mounted to the crankcase of the engine.
Figure 2:
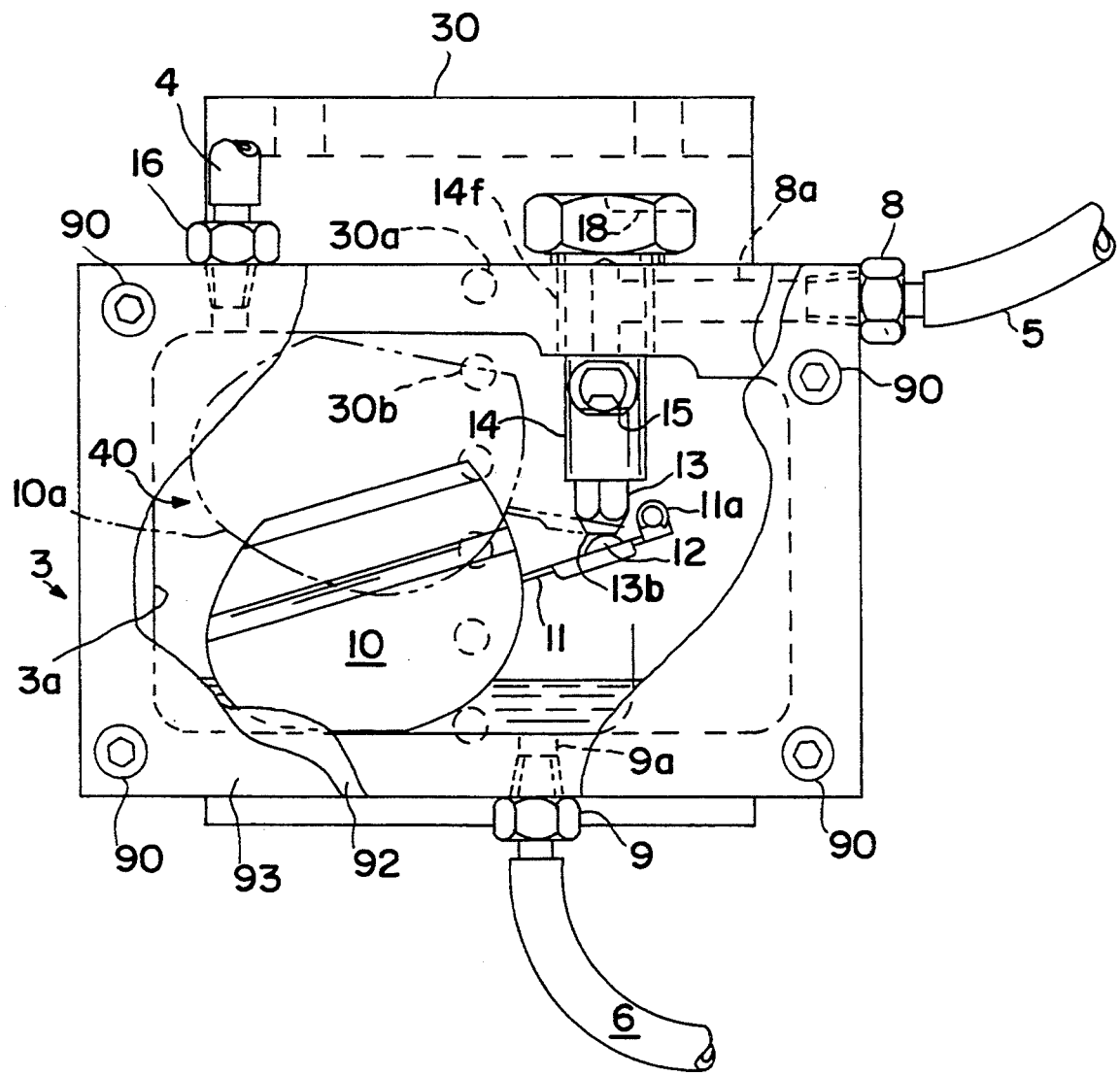
FIG. 2 is an enlarged view of the valve used with the apparatus according to the invention.

As shown in FIGS. 2 and 4, screws 90 are used to fasten a gasket 92 and the cover plate 93 to the valve housing 3a. FIG. 2 shows the float valve 3 with part of its cover broken away. The float valve 3 has a housing 3a which, together with a cover plate 93, defines a float chamber 40. Valve housing 3a has a fluid inlet 8, comprising a fluid passage 8a, and a fluid outlet 9, comprising a fluid passage 9a. The valve housing 3a also has a vent port 16 which, as shown in FIGS. 1 and 4, is connected to the crankcase 2 by a hose 4. Still referring to FIG. 1, fluid inlet 8 is connected to the outlet 23 of the reservoir 2 by a fluid conduit 5, preferably in the form of a hose. Fluid outlet 9 is connected to the fluid port or drain plug 7 of the crankcase 1 by a fluid conduit 6, also preferably in the form of a hose. FIG. 2 further shows a valve barrel 14 fluidically connecting fluid inlet 8 in fluid communication with the inside of the valve housing 3a.

Figure 3A:
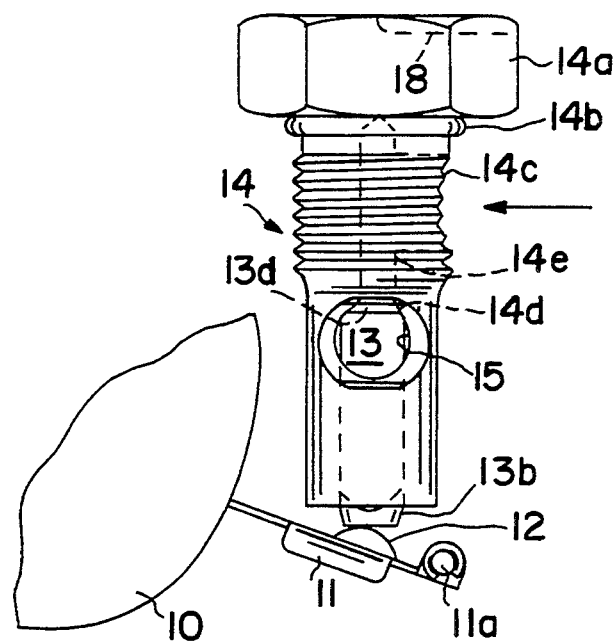
FIGS. 3A and 3B are views showing the details of the flow control element and barrel structure of the valve of FIG. 2.
Figure 3B:
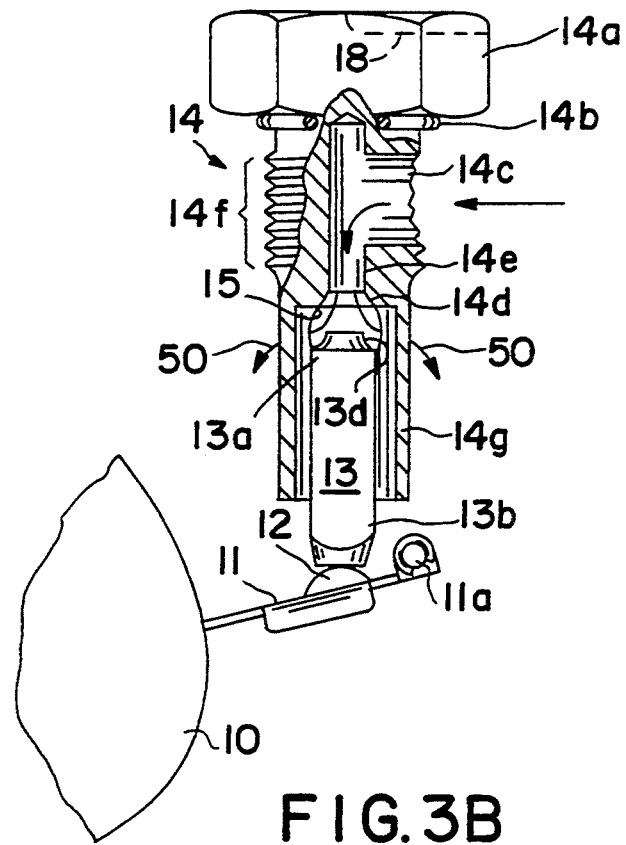

As shown in more detail in FIGS. 3A and 3B, the barrel 14 has a vertical bore 14g and a cross bore 15 crossing the bore 14g. Mounted for reciprocating updown motion within bore 14g is a vertically shiftable flow control element 13 having a follower portion 13b and a seat portion 13a. Between the follower portion 13b and the seat portion 13a, the flow control element has a triangular cross section. For proper operation with a high viscosity fluid, it is critical that the flow control element 13 have a triangular cross section, to minimize drag between the control element 13 and the bore 14g.

The flow control element 13 is mounted for reciprocating updown motion within the bore 14g of the barrel 14. As shown in FIG. 2, the vertical reciprocating motion of the control element 13 is caused by a thrust transmitting connection made by the follower portion 13b abutting a contact portion 12 of a pivoted lever 11, which is pivotally connected to the valve housing 3a on a horizontally extending axis 11a. The free end of the lever is rigidly secured to a float 10. Thus, as the float 10 rises and lowers in accordance with the level of lubricating fluid in the float chamber 40, the float 10 causes the lever 11 to pivot and the contact portion 12 to move up and down. Since the flow control element follower portion 13b of the flow control element 13 is in abutment with the contact portion 12 of lever 11, the flow control element 13 moves up and down with the movement of the contact portion 12.

FIGS. 3A and 3B show the details of the flow control element and barrel structure. Barrel 14 generally takes on the shape of a hollow, large diameter screw having threads 14f and which will be screwed into a threaded opening in the float valve 3. The barrel 14 has a hex-top 14a for easy mounting of the barrel 14 to the float valve 3 and it is sealed with a rubber washer 14b for preventing the leakage of fluid out of the float valve. Referring also to FIG. 2, a fluid passage 8a, together with an inlet 14c and a fluid channel 14e, places the fluid inlet 8 in fluid communication with the bore 14g. Channel 14e, in the area of the top of the bore 14g has an annular shoulder or seat 14d. In order to insure that the barrel 14 has been properly positioned to align its inlet 14c with fluid passage 8a, a groove 18 is formed from the center to an edge of the top of the hex-top 14a in parallel relation to the inlet 14c. During assembly of the barrel 14 in the housing 3a, the last turn of the barrel 14 places the groove 18 in alignment with the fluid inlet 8 as shown in FIGS. 2 and 4. As designed, the barrel 14 eliminates the use of elbows which would otherwise be needed. Elbows were found to hinder flow to such an extent that the device did not operate at cold temperatures.

When the valve 3 is in its closed or "off" position (FIG. 3A), an annular seating surface 13d of the seat portion 13a of the flow control element 13 mates with the annular seating surface 14d of the barrel 14 effectively closing the fluid channel 14e. This effectively blocks the bore 14g from being in fluid communication with the fluid channel 14e of the barrel 14 and prohibits the flow of lubricating fluid from the reservoir 2 into the float chamber 40 of the float valve 3.

When the flow control element 13 of the valve 3 is in the open or "on" position (FIG. 3B), the seating surface 13d of the seat portion 13a of the flow control element 13 separate from the conical shoulder 14d of the barrel 14 to effectively open the fluid channel 14e. This places the bore 14g in fluid communication with the fluid channel 14e of the barrel 14. To facilitate the flow of lubricating fluid from fluid channel 14e into the float chamber 40, the cross bore 15 is located close to the seating surface 14d so that when the flow control element 13 moves down, the fluid readily flows out the bore 15 into the float chamber 40 as indicated by arrows 50.

The details of the invention having been described, it will now be described how the apparatus according to the invention operates.

When the crankcase 1 has been filled with lubricating fluid to its predetermined level 21, the level of lubricating fluid in the float valve 3 will be at the same level 21 as the lubricating fluid in the crankcase 1. This causes the float 10 in the float valve 3 to pivot up to its position shown in broken lines 10a, FIG. 2, which in turn causes the contact portion 12 to move up and place the flow control element 13 in its "off" or closed position described above.

Then, assuming, for example, the vehicle is driven an appreciable amount and lubricating fluid either leaks out of the system or is consumed for whatever reason, the level of lubricating fluid in the crankcase 1 will drop below the predetermined level 21. Accordingly, the level of lubricating fluid inside the float valve 3 will also drop to a level equal to the level inside the crankcase 1. This causes the float 10 in the float valve 3 to pivot down by some angular amount. This movement of the float 10 and its integral lever 11 will cause the contact portion 12 to move down and allow the flow control element 13 to move downwardly to its "on" or open position described above. As a result, lubricating fluid will flow through inlet 8 and into barrel 14, through fluid channel 14e of the barrel 14 and into valve chamber 40 through bore 15, and, finally, out of float valve 3 into crankcase 1 through fluid outlet 9, fluid conduit 6, and fluid port 7. When enough lubricating fluid enters crankcase 1 such that the level of fluid in the crankcase 1 reaches the predetermined level 21, the same predetermined level will be reached in the float chamber 40 of the float valve 3 and the float 10 will rotate contact portion 12 upwardly to cause the flow control element 13 to be placed in the "off" position described above.

The reservoir 2 is vented to the atmosphere via vent 50, thus preventing the creation of a vacuum within the reservoir. Float valve 3 also has a vent port 16 for the float chamber 40. This vent port 16 is connected by a hose 4 to the valve cover 41 of the engine 20 which is at a point on the engine above the normal level for the lubricating fluid. The connection established by vent hose 4 equalizes the pressure in the valve chamber 40 with the pressure in the crankcase 1. This is especially important in the instant invention because, in order for the oil in the chamber 40 to be at the same level as the oil in the crankcase 1, the chamber 40 and crankcase 1 must be subjected to the same pressure.

Since different engines and different engine applications require different lubricating fluid levels within the crankcase 1, the position of the float valve 3 must also be variable since it must be at the level of the oil within the crankcase. As shown in FIG. 4, this is achieved by use of a bracket 30 similar to that shown in U.S. Pat. No. 4,522,167. The bracket 30 is mounted to a lip, 1a, of the crankcase 1 by nut/bolt connector 80. This bracket 30 has multiple holes 30a–f. Threaded members 95 attached to the back of valve housing 3a can be placed through registering holes in the bracket 30, corresponding to the exact level of oil needed in a particular engine, and then fastened with a fastener 96.

In some instances there is insufficient space available in the engine compartment of the truck or other vehicle to mount the reservoir 2. In such instance, the reservoir may be successfully mounted at a remote location such as behind the cab. In a remote mounting it is important to avoid dips, valleys and sharp turns of the hose connecting the reservoir to the valve so as to avoid excessive flow resistance which could lead to malfunction of the device in cold weather conditions.

An important feature of the invention is the valve's ability to withstand the forces applied thereto when the vehicle hits bumps or by the effects of splashing of lubricating fluid inside the crankcase 1. The minor splashing of lubricating fluid in the confined space of the float chamber has no adverse affect on the operations of the float 10. The fluid surface area within the float chamber 40 is a minor fraction of the fluid surface area within the crankcase 1. The adverse effect of splashing is further minimized by the float 10 occupying the major available fluid surface within the float chamber 40. By placing the fluid port 7 well below the normal oil level, the float chamber 40 is isolated from the splashing disturbance occurring at the fluid surface in the crankcase 1. Also contributing to minimizing of the effects of splashing is the relatively restricted passageway afforded the lubricating fluid between the crankcase and the float chamber 40. This minimization of the effects of splashing greatly increases the accuracy at which the float valve 3 operates.

Another feature of this apparatus is its lack of a need for any source of external power because the float valve is always operative since it only relies on gravity to work. As a result the invention operates regardless of whether the engine is running and regardless of whether or not batteries or other sources of power are available. Accordingly, a vehicle, which has been sitting unattended in a garage for many months leaking its oil due to, for example, a bad gasket, will still always have the proper amount of oil therein since the invention is always operative because it only relies on gravity to work. The oil addition device of this invention does not require power to operate, nor does it require running of the engine. It does not require pumps, wires, sensors, solenoids or electronics. Since the crankcase drain plug is utilized for the fluid connection with the float valve, there is no need to drill a hole in the oil pan of the crankcase. With this device the inconvenience of purchasing oil while "on the road" is avoided.

The above description is given in reference to a lubricating fluid addition apparatus. However, it is understood that many variations are apparent to one of ordinary skill in the art from a reading of the above specification and such variations are within the spirit and scope of the instant invention as defined by the following appended claims.

That which is claimed:

1. A lubricating fluid addition apparatus, comprising:
   a crankcase of an internal combustion engine, said crankcase containing a predetermined level of lubricating fluid;
   said crankcase having a fluid port below said predetermined level of lubricating fluid;
   a reservoir of lubricating fluid spaced above said crankcase and having a fluid outlet;
   a valve housing mounted to said crankcase and having a bottom, said valve housing having a fluid inlet and a fluid outlet, said fluid outlet being located in said bottom and below said fluid inlet, said valve housing containing a valve, said valve including a barrel extending into said housing and presenting a seating surface which is disposed within said housing and a shiftable flow control element engageable with said seating surface, said valve being operative in response to the level of lubricating fluid within said crankcase;
   a vent in the top of said valve housing in communication with said engine above said fluid level to equalize pressure between said valve housing and said engine;
   said fluid outlet of said reservoir being connected to said fluid inlet of said valve housing by a fluid conduit;
   said fluid outlet of said valve housing being connected to said fluid port of said crankcase;
   said barrel being removable from said valve housing without having to disassemble said valve housing and without disconnecting said fluid conduit from said fluid inlet,
   whereby when the level of lubricating fluid within said crankcase drops below said predetermined level, said valve allows lubricating fluid to flow by gravity to said crankcase without requiring the running of said internal combustion engine or other power to operate said valve.

2. The apparatus according to claim 1, wherein said valve is a float valve.

3. The apparatus according to claim 2, wherein said float valve is unaffected by forces caused when the vehicle carrying said device hits a bump.

4. The apparatus according to claim 3, wherein said float valve is unaffected by forces caused when the vehicle hits a bump because said fluid port of said crankcase is positioned sufficiently low enough in said crankcase such that a pressure head created in said fluid conduit between said valve and said crankcase is substantially constant regardless of the forces applied to said vehicle.

5. The apparatus according to claim 2, wherein said float valve is substantially isolated from the effects of splashing of lubricating fluid inside said crankcase by a restricted passage connection between said crankcase and said float valve.

6. The apparatus according to claim 2, wherein said float valve further comprises:
   a pivoted lever having a contact portion;
   a float mounted to said lever;
   a barrel having a fluid channel and a bore in fluid communication with said fluid inlet;
   a flow control element having a seat portion, said flow control element reciprocally mounted in said fluid channel such that:
   a) when said flow control element rises, said seat portion rises and closes the fluid communication between said fluid inlet and said bore; and
   b) when said flow control element drops, said seat portion drops and opens the fluid communication between said fluid inlet and said bore;
   whereby movement of said float causes movement of said lever and contact portion, thereby moving said flow control element.

7. The apparatus according to claim 6, wherein said flow control element has a triangular cross section to reduce friction between said element and said bore.

8. The apparatus according to claim 1, wherein said valve housing is mounted to the internal combustion engine at a level equal to said predetermined level.

9. The apparatus according to claim 8, further comprising a valve housing mounting bracket secured to said engine providing a plurality of vertically spaced mounting positions for said valve housing and means releasably securing said valve housing to said bracket at one of said mounting positions.

10. The apparatus according to claim 1, wherein said reservoir is vented to the atmosphere to prevent the formation of a vacuum therein.

11. A lubricating fluid addition apparatus for automatically maintaining a predetermined level of lubricating fluid in a crankcase of an internal combustion engine, said apparatus comprising:
    a fluid port in said crankcase at a location not higher than said predetermined level;
    a reservoir of lubricating fluid spaced above said predetermined level and having a fluid outlet;
    a valve housing mounted to said crankcase and having a top and a bottom, said valve housing having a fluid inlet and a fluid outlet, said fluid outlet being located in said bottom of said valve housing and below said fluid inlet;
    a vent in said top of said valve housing in communication with said engine above said fluid level to equalize pressure between said valve housing and said engine;
    said fluid outlet of said reservoir being connected in fluid communication with said fluid inlet of said valve housing by a fluid conduit;
    said fluid outlet of said valve housing being connected in fluid communication with said fluid port of said crankcase;
    a valve in said valve housing including a removable flow control element shiftable between a closed position in which a flow of lubricating fluid from said reservoir to said crankcase is prevented and an open position in which flow of lubricating fluid from said reservoir to said crankcase is permitted, said flow control element being removable without having to disassemble said valve housing and without disconnecting said fluid conduit from said fluid inlet; and means operative without power to automatically maintain said flow control element in its closed position when said lubricating oil in said crankcase is at a level at least as high as said predetermined level and operative to automatically shift said flow control element to its open position when the level of lubricating fluid within said crankcase drops below said predetermined level, whereby lubricating fluid is automatically added by gravity flow through said valve to said crankcase to maintain said lubricating fluid at said predetermined level regardless of whether or not said internal combustion engine is running.

12. The apparatus according to claim 11 wherein said valve is a float valve having a float and wherein said valve housing includes a float chamber connected to said fluid outlet of said valve housing and disposed at a level at which it is partially filled with lubricating fluid when the lubricating fluid is at said predetermined level within said crankcase, said float being pivotally connected to said housing and resting on an area of the surface of said lubricating fluid in said chamber, said float being operatively connected to said flow control element.

13. The apparatus according to claim 12 wherein said float has a contact portion in abutment with said flow control element.

14. The apparatus according to claim 12 wherein said connection between said fluid outlet of said reservoir and said fluid port of said valve is restricted in flow capacity to substantially isolate said float chamber from the effects of splashing of lubricating fluid in said chamber.

15. The apparatus according to claim 12 wherein said float chamber of said valve is vented to said engine at a point above said predetermined level.

16. A lubricating fluid addition apparatus for attachment to a crankcase of an internal combustion engine, comprising:

a valve housing mounted to said crankcase, said valve housing including top, bottom and side walls and a chamber therein, said bottom wall having therein a fluid outlet passage connected to said crankcase, one of said side walls having therein a fluid inlet passage and said top wall having therein a valve element receiving bore disposed perpendicular to said fluid inlet passage;

a valve in said housing including a valve element insertable through said bore and operable to control fluid flow to said chamber by way of said fluid inlet passage; and a float in said housing operating said valve element.

17. The apparatus according to claim 16, wherein said valve includes a barrel insertable in said bore, said barrel including a seat and said valve element including a seating surface engageable with said seat.

18. The apparatus according to claim 16 and further comprising:

a pivoted lever connected to said float and having contact portion;

a barrel mounted in said bore having a fluid channel and a passage in fluid communication with said fluid inlet;

said valve element being reciprocally mounted in said fluid channel and being in engagement with said contact portion of said lever whereby (a) when said float rises, said seating surface engages said seat to prevent fluid communication between said fluid inlet and said fluid channel; and (b) when said float drops, said seating surface disengages from said seat permitting fluid communication between said fluid inlet and said fluid channel.

19. The apparatus according to claim 18, wherein said barrel is removably mounted within said valve element receiving bore.

20. A lubricating fluid addition apparatus for attachment to a crankcase of an internal combustion engine comprising:

a reservoir of lubricating fluid above said crankcase;

a valve housing mounted to said engine at one lateral side of said crankcase and including top, bottom and side walls defining a laterally outward open cavity, said valve housing including a side cover plate removably secured to the laterally outward side of said valve housing closing said cavity to form an interior chamber in said valve housing;

a fluid inlet passage in a wall of said valve housing connected to said reservoir by a fluid conduit;

a fluid outlet in a wall of said valve housing connected in fluid supplying relation to said crankcase by a fluid conduit;

a float valve in said valve housing operable to control flow of lubricating fluid from said fluid inlet to said chamber; and said side cover plate being removable to permit inspection and servicing of said float valve without removal of said valve housing from said engine and without disconnecting said fluid conduits from said fluid inlet and fluid outlet.

* * * * *